H. Holden,

Tile Machine.

No. 1,953. Reissued May 9, 1865.

Inventor:
Humphrey Holden

Witnesses:
John E. Earle
Rufus Sanford.

N. PETERS, PHOTO-LITHOGRAPHER, WASHINGTON, D. C.

UNITED STATES PATENT OFFICE.

HUMPHREY HOLDEN, OF NEW HAVEN, CONNECTICUT.

IMPROVED MACHINE FOR MAKING CEMENT PIPE.

Specification forming part of Letters Patent No. 44,369, dated September 20, 1864; Reissue No. 1,953, dated May 9, 1865.

*To all whom it may concern:*

Be it known that I, HUMPHREY HOLDEN, of New Haven, in the county of New Haven and State of Connecticut, have invented a new and Improved Machine for Making Cement Pipes; and I do hereby declare that the following is a full, clear, and exact description thereof, which will enable others skilled in the art to make and use the same, reference being had to the accompanying drawings, forming part of this specification, in which—

Figure 1:
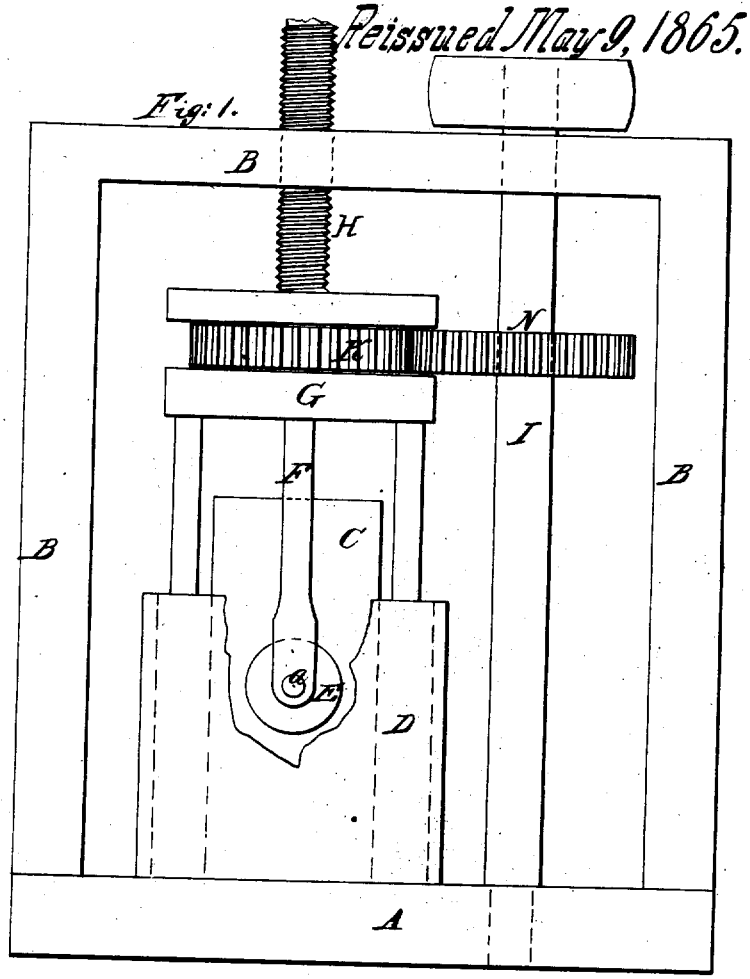
Figure 2:
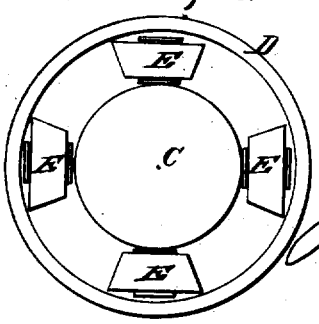

Figure 1 is a side or front view of the device, and Fig. 2 a plan of the core and case.

Similar letters of reference indicate like parts.

In the manufacture of cement pipe the practice has hitherto been to place the composition in small quantities between the core and case of the flask and tramp down the composition by hand, a slow and laborious operation.

This invention is designed to substitute other than hand-power in order to facilitate the operation; and to this end it consists in constructing and arranging pressure-rollers in connection with the case and core in such a manner that the cement, as it is fed into the mold—that is to say, between the case and core—will be compressed or compacted from the bottom of the latter upward or toward the top of the same, thereby insuring perfect work and a superior article of pipe.

A is a base or bed plate; B, a frame supporting the operative mechanism. On the bed-plate I set the core C and case D, which may be of any known construction.

E are rolls. I illustrate four, but there may be more or less. (See Fig. 2.) The said rolls revolve on bearings *a* in supports F which are made fast to a head, G, firmly fixed to a perpendicular shaft, H, the latter being made to revolve either by applying power directly thereto or through a driving-shaft, I, connected by gears K N, as shown in Fig. 1.

On the shaft H, I cut a screw, and place a nut in the frame through which the screw of the shaft H works, and causes the rolls to rise or fall, according to the direction in which the screw is turned.

The rolls, being near the bottom of the mold, are made to revolve by power applied as above described, the composition being fed into the mold at the top. The rolls press down the composition and gradually rise under the action of the screw and nut, the feeding of the composition into the mold being of course graduated according to the rising movement of the rolls, in order to insure a proper pressure of the latter on the cement. Instead of the screw and nut, however, the rolls may be weighted or loaded, so as to give the requisite pressure by gravity, the rolls rising as the mold is filled, being pressed up by the cement.

If the power is applied to the driving-shaft I, the gear N must be constructed so as to slide freely up and down the shaft with the head G and at the same time turn with it.

I claim as new and desire to secure by Letters Patent—

The employment or use, in a machine for making cement pipe, of a series of rolls, or their equivalents, arranged in connection with a mold—that is, a case and core—in such a manner that the cement will be gradually compressed or compacted in the mold from the bottom toward the upper end of the latter, substantially as and for the purpose herein set forth.

HUMPHREY HOLDEN.

Witnesses:

HENRY U. PARKER,

JAMES I. PARKER.